(12) United States Patent  
Koren et al.

(10) Patent No.: US 8,001,132 B2
(45) Date of Patent: Aug. 16, 2011

(54) METHODS AND APPARATUS FOR IMPROVED NEIGHBORHOOD BASED ANALYSIS IN RATINGS ESTIMATION

(75) Inventors: Yehuda Koren, Elizabeth, NJ (US); Robert Bell, Murray Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 482 days.

(21) Appl. No.: 12/107,449

(22) Filed: Apr. 22, 2008

(65) Prior Publication Data
US 2009/0083258 A1  Mar. 26, 2009

Related U.S. Application Data

(60) Provisional application No. 60/975,314, filed on Sep. 26, 2007.

(51) Int. Cl.
  *G06F 7/20* (2006.01)
  *G06F 17/30* (2006.01)
(52) U.S. Cl. ......... 707/751
(58) Field of Classification Search ........... 707/3, 751
  See application file for complete search history.

(56) References Cited

U.S. PATENT DOCUMENTS

| | | | |
|---|---|---|---|
| 2004/0103092 A1* | 5/2004 | Tuzhilin et al. | 707/3 |
| 2004/0158497 A1* | 8/2004 | Brand | 705/26 |
| 2006/0271286 A1* | 11/2006 | Rosenberg | 701/211 |
| 2008/0120339 A1* | 5/2008 | Guan et al. | 707/104.1 |

* cited by examiner

*Primary Examiner* — James Trujillo
*Assistant Examiner* — Amresh Singh

(57) ABSTRACT

Systems and techniques for estimation of item ratings for a user. A set of item ratings by multiple users is maintained, and similarity measures for all items are precomputed, as well as values used to generate interpolation weights for ratings neighboring a rating of interest to be estimated. A predetermined number of neighbors are selected for an item whose rating is to be estimated, the neighbors being those with the highest similarity measures. Global effects are removed, and interpolation weights for the neighbors are computed simultaneously. The interpolation weights are used to estimate a rating for the item based on the neighboring ratings, Suitably, ratings are estimated for all items in a predetermined dataset that have not yet been rated by the user, and recommendations are made of the user by selecting a predetermined number of items in the dataset having the highest estimated ratings.

12 Claims, 4 Drawing Sheets

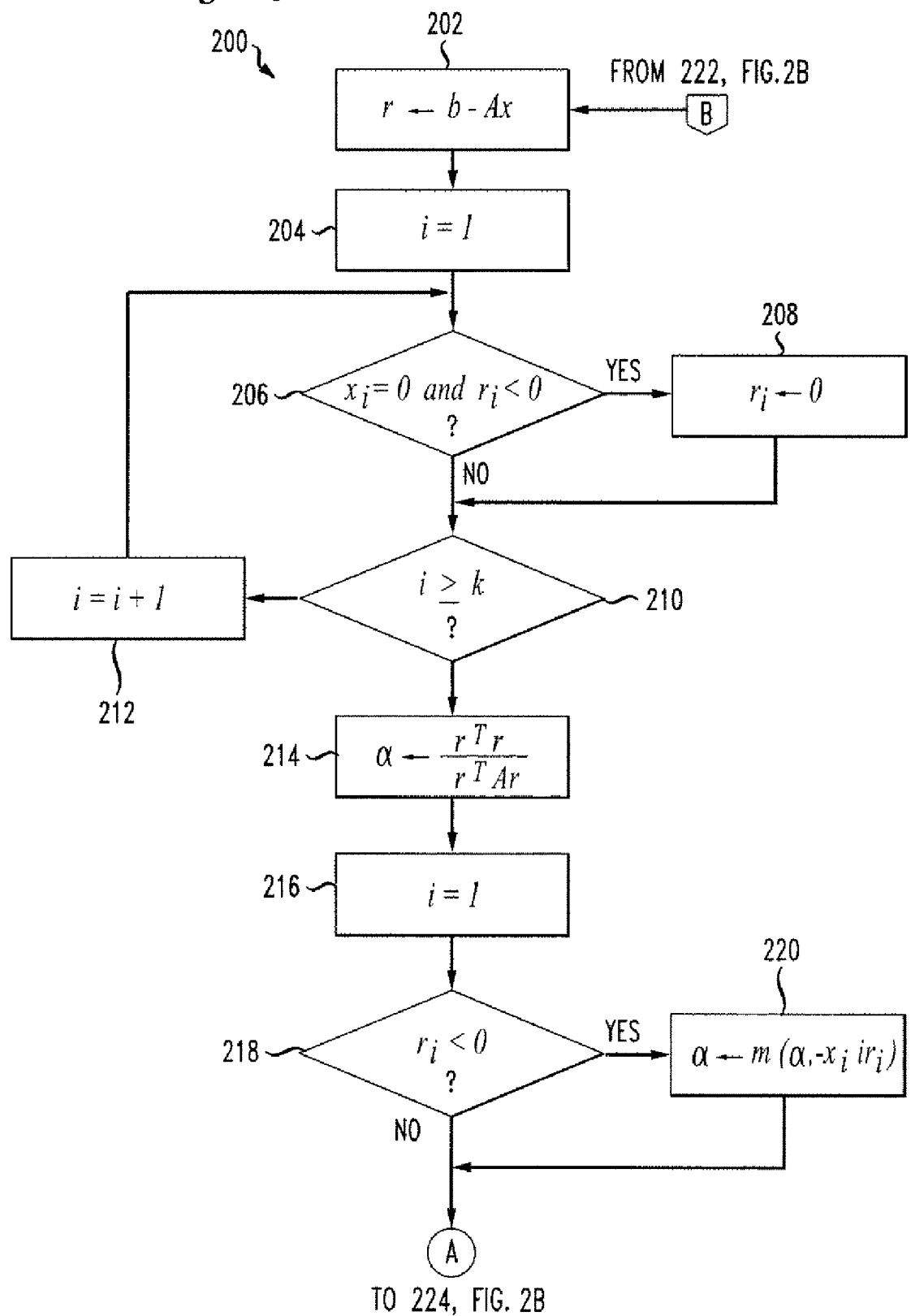

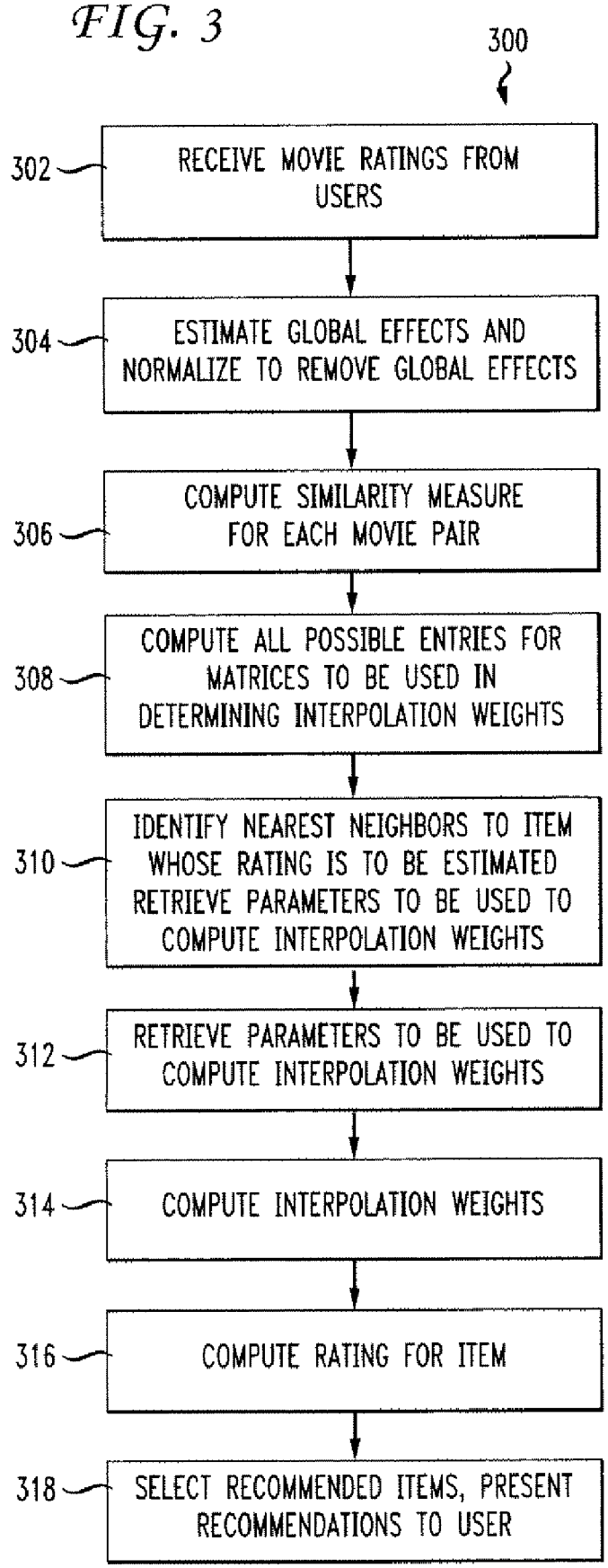

METHODS AND APPARATUS FOR IMPROVED NEIGHBORHOOD BASED ANALYSIS IN RATINGS ESTIMATION

This Application claims the benefit of Provisional Application Ser. No. 60/975,314, filed Sep. 26, 2007, which is incorporated herein by reference in its entirety. Related subject matter is discussed in Koren, Bell, and Volinsky, "Improved Systems and Techniques for Modeling Relationships at Multiple Scales in Ratings Estimation," U.S. patent application Ser. No. 12/107,309, filed on even date with the present invention, assigned to the common assignee of the present invention and incorporated herein by reference in its entirety.

FIELD OF THE INVENTION

The present invention relates generally to improvements to estimating unknown user ratings in automated recommender systems. More particularly, the invention relates to improved systems and techniques for neighborhood based collaborative filtering for rating estimation.

BACKGROUND OF THE INVENTION

Modern consumers are inundated with choices. Numerous varieties of products are offered to consumers, with consumers having unprecedented opportunities to select products that meet their needs. The opportunity for selection also presents the need to select, that is, to spend time and effort engaging in the selection process. The development of widely used and inexpensive processing systems has led vendors to develop techniques for directing customers to products expected to satisfy them. One area in which such systems are particularly useful is that of entertainment products, such as movies. Numerous customers may view the same movie, and in addition, each customer is likely to view numerous different movies. Customers have proven willing to indicate their level of satisfaction with particular movies, so that a huge volume of data is available as to which movies appeal to which customers. Proper examination and processing of this data can be used to recommend movies to particular customers, and such examination and processing can be conducted for any sort of product or service for which data can be collected. The remainder of this discussion will be presented in terms of ratings of movies, although it will be recognized that the teachings of the present invention can be applied to any situation in which it is desired to estimate the desirability of an item for a user.

A movie recommendation is essentially an estimate of the rating a user would give to an item that he or she has not yet viewed, based on computations based on previous ratings. One widely used technique for recommendations is called collaborative filtering, in which a recommendation for a user relating to a particular item is based on a user's previous ratings of different movies, and ratings of other users for the movie under consideration, as well as different movies. One popular approach to collaborative filtering is neighborhood based collaborative filtering. Unknown ratings are estimated based on recorded ratings of like minded users, that is, on ratings that have been given to a particular movie by users that have also given similar ratings to other movies as those given by the user under consideration. A rating for an item i is suitably expressed as a value $r_{ui}$, where for a user u, a set N(u;i) is created of users that tend to rate similarly to u, and who have rated item i. The estimated value of $r_{ui}$ is then taken as a weighted average of the neighbors' ratings, with the degree of similarity of a neighbor to the user u being used to give an appropriate weight to that user's rating.

Similarly, an item oriented approach can be taken. A rating is estimated using known ratings made by the same user on similar items. A set of neighboring items N(i;u) is created that other users tend to rate similarly to their rating of i. All items in N(i;u) must have been rated by the user u. The estimated value of $r_{ui}$ is taken as a weighted average of the ratings of neighboring items.

Neighborhood based methods are intuitive and relatively simple to implement, without a need to present many parameters or to conduct an extensive training stage. They also allow for presenting a user with similar items that he or she has rated, and giving the user an opportunity to change previous ratings in accordance with his or her present tastes, with the understanding that this act will affect subsequent ratings.

SUMMARY OF THE INVENTION

Among its several aspects, the present invention recognizes that a number of drawbacks exist with prior art neighborhood based techniques. First, similarity measures used in selecting neighbors and weighting prior ratings are frequently arbitrarily chosen. Prior art techniques have typically not satisfactorily quantified the concept of similarity between users and similarity between items and have not generally proven able to determine a fundamental justification for such measures.

Another problem is that prior art neighborhood based methods do not account for interactions between neighbors. Each similarity between an item i and a neighbor that is a member of the set of neighbors is computed independently of the content of the set and the other similarities between members of the set and between members of the set and the item under consideration. For example, many movies, such as the Lord of the Rings trilogy, are highly correlated with one another. If the similarity of these movies is ignored when their appropriate weightings are assigned, they may essentially be triple counted.

In addition, prior art neighborhood based methods sum weights to one, raising the possibility of overfitting. If an item has no useful neighbors, it would be best to ignore the neighborhood information, retaining the current data normalization. However, prior art techniques use a weighted average which takes the uninformative neighbors into account. A further difficulty is that neighborhood methods may not work well if variability differs substantially among neighboring items or users.

To this end, a system according to an aspect of the present invention implements improved techniques for neighborhood based filtering. The system receives ratings of items by users, for example, by soliciting ratings after a rented or subscription item has been returned. A corpus of user ratings is maintained, including each rating given to an item by a user, with each rating identified by item and user. These ratings may suitably be processed to remove global effects. If this processing is performed, the corpus of ratings includes the ratings as processed to remove global effects. The corpus of ratings may be stored in a central database in a data processing system. In order to provide recommendations to a user, a rating is suitably estimated for each item that has not been rated by that user. Specifically, similarity measures of interest are computed, such as measures for similarities between items and between users. Measures for similarity between pairs may suitably take into account the number of users rating both members of a pair, with resealing being performed to take into account variables affecting the significance of the number of users rating both members.

Neighbors are selected based on the similarity measures, and interpolation weights are computed in order to assign proper weighting to the neighbors. The interpolation weights may suitably be defined by solving a least squares optimization problem.

In preparation for computing ratings for a particular user, precomputations of large volumes of data are suitably performed. Similarities between each pair of items are computed, along with inner product matrices and vectors used to compute interpolation weights, that is, weighting to be given to ratings of neighbors of the item whose rating is to be estimated. Computation of interpolation weights suitably includes averaging pairwise ratings over the support that exists, and shrinking the averages toward a common mean.

In order to estimate a rating, the similarity values are examined and a predetermined number of neighbors most similar to the item in question are selected. Next, inner products for those neighbors are retrieved from the precomputed set. The interpolation weights are then used to compute an estimated rating for the user and item in question. A predetermined number of items having the highest estimated ratings for the particular user are then presented to the user.

Item based estimation may suitably be used, with similarities being computed between items being rated. If user based estimation is used, similarity measures between users may advantageously be computed by embedding users in a low dimensional Euclidean space using singular value decomposition, with ridge regression being used in performing the singular value decomposition in order to account for missing values. In addition, relationships between items may be taken into consideration when performing user based ratings estimation, including determining similarity measures between the item i and other items and assigning a higher importance to items similar to i when assigning interpolation weights to users rating items similar to i.

A complete understanding of the present invention, as well as further features and advantages of the invention, will be apparent from the following Detailed Description and the accompanying drawings.

BRIEF DESCRIPTION OF THE DRAWINGS

FIGS. 2A and 2B illustrate a process of optimization that may be advantageously employed by a system according to an aspect of the present invention; and FIG. 3 illustrates a process of movie recommendation and distribution according to an aspect of the present invention.

DETAILED DESCRIPTION

Figure 1:
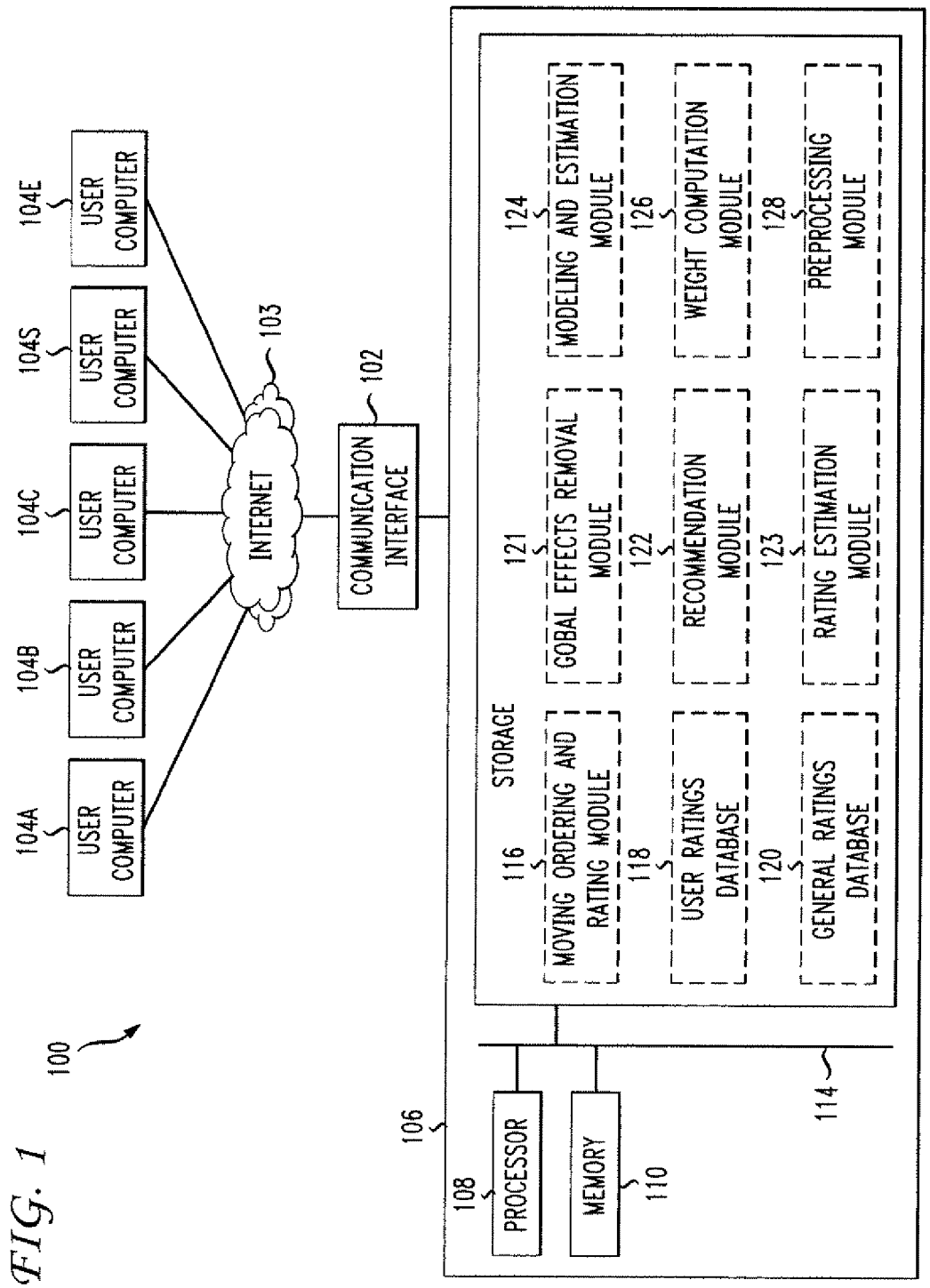
FIG. 1 illustrates a movie distribution system employing the teachings of the present invention.

FIG. 1 illustrates a movie distribution system 100 employing the teachings of the present invention. As described in greater detail below, the system 100 solicits ratings from users and employs improved techniques for rating estimation, that is, the estimation of a rating that would be given by a user to a particular item if the user had viewed that item. The system 100 employs improved neighborhood based collaborative filtering. Neighborhood based collaborative filtering includes selecting a plurality of neighboring ratings, with the neighboring ratings being chosen based on similarities between the ratings. Weightings are assigned to the neighbors and appropriately chosen and weighted neighboring ratings are used to compute an estimate for the rating in question.

Improved aspects of neighborhood based collaborative filtering employed according to various aspects of the present invention include improved computation of interpolation weights used to assign the weightings that should be given to neighboring ratings. Additional aspects involve processing of ratings provided by users to remove global effects and improved techniques for computing similarities between items and between users. Additional aspects involve improved user based computation, including rapid techniques for identifying neighboring users and the introduction of item characteristics into user base ratings. Details of these aspects of the present invention, and other advantages and improvements, are discussed below.

The system 100 includes a communication interface 102, suitably connected to the Internet 103, allowing communication with a plurality of customer stations 104A-104E. The system 100 further includes a server 106, including a processor 108, memory 110, and storage 112, communicating over a bus 114. The server 106 is suitably connected to the communication interface 102 through the bus 114. While a single server 106 is illustrated here for simplicity, it will be recognized that a system 100 may include multiple servers and other devices, arranged in whatever way is desired to meet the communication and processing demands imposed on the system 100.

The server 106 hosts a movie ordering and rating module 116, implemented as software hosted on the storage 112 and transferred to memory 110 as needed for execution by the processor 108. When a user, for example, user u at user station 104A, initiates contact with the system 100, the ordering and rating module 116 is invoked, allowing a user to browse and search movies for ordering. In addition, a suitable time after ordering, such as when a movie is returned in the case of a rental or subscription service, the user is given an opportunity to rate a movie, for example on a 1-5 scale, with 1 being "poor" and 5 being "excellent." The ratings given by a user may be stored in a user ratings database 118 associated with the specific user, and a general ratings database 120, in which the ratings are stored in combination with those of all other users. The general ratings database 120 suitably accommodates ratings from all users of the system 100. Each rating is associated with a specific user, in the sense that ratings from the same user can be identified as having come from the same user, but in the general ratings database 120, the association of a rating with a user may not necessarily include identifying information for the user.

As discussed in greater detail below, ratings may exhibit global effects, such as systematic tendencies for some users to give higher ratings than others, and for some items to receive higher ratings than others. In addition, accuracy is improved by making an adjustment for the possibility that some items were primarily rated by users that tend to rate higher, while some other items were rated by users that tend to rate lower.

In addition, information is frequently available about items or users that can be used to benefit the estimation. Variables such as the number of ratings of an item or by a user, and the average rating of an item or a user can, for example, distinguish between users who prefer the most commonly rated items from users who prefer more specialized items. In addition, characteristics of specific ratings, such as the date of the rating, may explain some of the variation in scores. For example, a user's average ratings may rise over time, and this rise can be isolated from any inherent quality of the items. Similarly, some items may experience a fall in ratings as time passes after their release date, while others may maintain their average rating. In order to compensate for such tendencies, the system 100 may suitably implement a global effects processing module 121. The global effects processing module 121 normalizes user provided ratings so as to remove global effects such as those mentioned above. If removal of global effects is employed, the normalized ratings are stored in the database 120 and used in the same way as if global effects removal were not employed. The processes and computations involved in global effects removal are discussed in greater detail below.

In offering movies to the user, the ordering and rating module 116 suitably invokes a recommendation module 122. The recommendation module 122 presents specific recommended movies to the user, based on ratings computed for the movies, with ratings being treated according to some selected criterion. For example, the recommendation module 122 may present the 5 movies having the highest ratings. To take another example, the recommendation module 122 may present the 5 movies of each of a selection of genres having the highest ratings for movies of that genre, for example, 5 highest rated comedies, 5 highest rated action movies, 5 highest rated dramas, and so on. The recommendation module 122 suitably employs a rating estimation module 123, which computes estimated rating values for each movie to be rated. The rating estimation module 123 computes an estimated value all $r_{ui}$. This value represents the rating that a user u would assign to the item i, if the user had viewed that item. If the user u has already rated the item i, there is no need to compute a rating for that user and that item. Instead, that rating serves as useful data for estimating ratings for other items by the same user, and for ratings of that item by other users.

If the system 100 includes n users and m items, the total available ratings would theoretically include ratings about n users and m items, arranged in an n×m matrix R= $\{r_{ui}\}_{1 \leq u \leq m, 1 \leq i \leq n}$.

In order to compute an estimated rating, the rating estimation module 123, and the modules that it invokes, employ improved techniques for a number of operations that are undertaken in estimating neighborhood based ratings. These improved techniques involve improved computational techniques, including improved techniques for determining relationships between parameters used in estimation. One important aspect of rating estimation is the weighting of known ratings, so that each known rating will be assigned an appropriate level of importance for its contribution toward the computed ratings estimate. Such improved techniques for computing appropriate weightings are described in greater detail below.

Additional improved techniques include improved computation of similarity measures relating to ratings, such as similarities of rated items to the item for which the rating is being estimated, or similarities of rating users to the user for whom the rating is being estimated, and the use of these similarities to identify neighbors. Additional improved techniques include normalization to exclude global effects, as well as additional improved techniques.

Known Values Used in Estimation

These techniques, and other techniques described below, provide for efficient ways of dealing with difficulties presented in neighborhood based estimation, such as problems presented by sparsity. In the typical case, few if any users will have rated more than a small proportion of the available items. For example, a user may have viewed only 100 of the thousands of items available, and taken the time to rate only a few dozen of these. Thus, the n×m matrix R identified above will include a great number of unknown values, and may be referred to as a sparse matrix. The rating estimation module 123 has access to the user ratings database 118 and the general ratings database 120, and processes rating information to generate one or more recommendations for the user that are estimated to conform to the user's preferences. The known entries of the matrix R, that is, those (u,i) pairs for which data is known, may be arranged in the set $\kappa = \{(u,i) | r_{ui}$ is known$\}$. Data for the set $\kappa = \{(u,i) | r_{ui}$ is known$\}$ may be stored in the general database 120.

As noted above, before storage in the general ratings database 120, the known values of $r_{ui}$ may be processed to remove global effects, for example, using the global effects removal module 121. Such processing is described in detail below, and leads to corrected values for each $r_{ui}$ for which such processing is accomplished. The processing of known values of $r_{ui}$ used to compute similarity scores and to estimate a user's rating for an item is accomplished in the same way whether or not removal of global effects is performed.

A set of indexing letters is employed here to distinguish users from items, and to distinguish those users and items for whom computations are being performed from those users and items whose data is known and is available for use in computations. Users may suitably be designated as u and v, with u being the user for whom an estimated value is being sought, and items as i, j, and k, with i being the item for which an estimated value is being sought. References to $r_{ui}$ are therefore references to values that are being estimated, while references to $r_{uj}$, or $r_{uk}$, are references to known ratings assigned by the user u, references to $r_{vi}$ are references to ratings for the item i provided by users other than the user u, and references to $r_{vj}$ and $r_{vk}$ are references by ratings given by other users for other items.

Overview of Rating Estimation

In order to compute ratings, the rating estimation module 123 suitably employs neighborhood based collaborative filtering. Looking at the user u as the exemplary user under discussion, neighborhood based collaborative filtering identifies a set of users who are neighbors for user u, with a neighbor being a user who has a tendency to assign similar ratings to those assigned by user u. If user u has not yet rated a movie, that movie's rating is unknown with respect to user u. The movie's rating will be referred to as an unknown rating and the movie will be referred to as an unrated movie. For a user u and an item i, the rating estimation module 123 estimates unknown ratings $r_{ui}$ for unrated movies. The set of neighbors is defined as N(u;i), and each neighbor v in the set has submitted an item rating for the particular item i under examination for user u. That is, for each v∈N(u;i), a $r_{vi}$ exists. In other words, there is a known, explicit rating that has been assigned by user v to item i. The estimated value of $r_{ui}$ for user u is taken as a weighted average of the neighbors' ratings:

$$r_{ui} \leftarrow \frac{\sum_{v \in N(u;i)} s_{uv} r_{vi}}{\sum_{v \in N(u;i)} s_{uv}} \quad (1)$$

$s_{uv}$ is a similarity measure, indicating the similarity between user u and user v, and is important both in choosing the members of the set N(u;i) and in weighting the average.

In addition to the user oriented approach, neighborhood based filtering also encompasses an item oriented approach. A rating is estimated using known ratings made by the same user on similar items. To estimate the unknown $r_{ui}$, a set of neighboring items N(i;u) is identified, that other users tend to rate similarly to their rating of i. All items in the set N(i;u)

must have been rated by the user u. The estimated value of $r_{ui}$ is computed as a weighted average of the ratings of neighboring items:

$$r_{ui} \leftarrow \frac{\sum_{j \in N(u;i)} s_{ij} r_{ij}}{\sum_{j \in N(u;i)} s_{ij}} \quad (2)$$

Item oriented approaches tend to provide better estimates than do user oriented approaches with more efficient computations, because the number of items is significantly lower than the number of users for large populations of users. Populations of users can number in the millions, tens of millions, or more, while the number of unique items is typically orders of magnitude lower. For example, the movie viewing population may number in the hundreds of millions, while the number of unique titles viewed by significant numbers of users may number in the thousands.

The rating estimation module 123 suitably implements a neighborhood relationships model, described in greater detail below. A modeling and estimation module 124 suitably implements a prediction rule of the form:

$$r_{ui} \leftarrow \sum_{j \in N(u;i)} w_{ij} r_{uj} \quad (3),$$

where $w_{ij}$ are members of a set of interpolation weights $\{w_{ij} | j \in N(i;u)\}$.

Techniques for estimating the value of $r_{ui}$ will be presented here first, followed by steps advantageously undertaken to compute and refine parameters used in estimating the value of $r_{ui}$.

Introduction to Neighbor Selection and Weighting and Use of Neighboring Values

Turning now to the estimating of the value of $r_{ui}$, in one present exemplary embodiment, an item oriented model is implemented. A set of neighbors is selected, focusing on all items rated by u. Among these items, the K most similar to i, again, the item whose rating is being computed, are selected. These items make up the set N(i;u). Experimental results have shown that suitable values for K may typically fall in the range of 20-50. Turning attention now to equation (3) above, it will be seen that the rating $r_{ui}$ is computed by summing the rating of each item in the set of K neighbors, with the rating of each neighbor being multiplied by its interpolation weight. The rating $r_{ui}$ is thus a weighted sum of the neighbors, and the primary tasks performed by the rating estimation module 123 involve selecting the correct neighbors and estimating appropriate interpolation weights.

For convenience, the K neighbors in the set N(i;u) may be indexed by 1, . . . , K and the corresponding interpolation weights arranged within $w \in R^K$. In order to generate the interpolation weights $w_{ij}$, the modeling and estimation module 124 employs a weight computation module 126. The weight computation module 126 derives all interpolation weights simultaneously to account for interdependencies among the neighbors. This goal is achieved by solving an optimization problem. The general problem and solution for the ideal case is described first for general understanding, followed by a description of the differences between the ideal case and the case as it is typically encountered in operation, and an improved solution for the typical real case that may be employed by the weight estimation module 126 and the rating estimation module 123.

Weight Computation for Dense Case

The optimization problem may be understood by considering a hypothetical dense case in which all users have rated both i and all its neighbors in N(i;u). In such a case, the weight computation module 126 would be able to determine the interpolation weights by modeling the relationships between i and its neighbors through a least squares problem:

$$\min_{w} \sum_{v \neq u} \left( r_{vi} - \sum_{j \in N(i;u)} w_{ij} r_{vj} \right)^2. \quad (4)$$

The only unknowns in equation (4) are the values of $w_{ij}$. The optimal solution to the problem presented by equation (4) can be found by differentiation to obtain a solution of a linear system of equations. A statistical approach yields as a solution the result of a linear regression, without intercept, of $r_{vi}$ on $r_{uj}$ for $j \in N(i;u)$. Specifically, the optimal weights are given by:

$$Aw = b. \quad (5)$$

Here, A is a K×K matrix defined as:

$$A_{jk} = \sum_{v \neq u} r_{vj} r_{vk} \quad (6)$$

Similarly, the vector $\hat{b} \in R^K$ satisfies:

$$b_j = \sum_{v \neq u} r_{vj} r_{vi} \quad (7)$$

Equation (5) is solved for each $w_{ij}$ using the values of A and b yielded by equations (6) and (7), respectively. These values may be used to solve equation (3).

Weight Computation in Typical Sparse Case

However, this solution is optimal only for the dense case mentioned above. Therefore, the weight computation module 126 employs improved techniques according to an aspect of the present invention in order to provide for an efficient computation of interpolation weights in a more typical case. In a typical case, few, or even no, users will have rated i and all its neighbors. It would therefore be difficult to meet the denseness criterion for the user required by equations (5)-(8). Even if enough users met the criterion to yield complete data for A to be nonsingular, that estimate would ignore a large proportion of the information about pairwise relationships among ratings by the same user. An estimate for A and b, up to the same constant, may be obtained by averaging over the support that exists, as follows:

$$\overline{A}_{jk} = \frac{\sum_{v \in U(j,k)} r_{vj} r_{vk}}{|U(j,k)|} \quad (8)$$

$$\overline{b}_j = \frac{\sum_{v \in U(i,j)} r_{vj} r_{vi}}{|U(i,j)|}, \quad (9)$$

where U(j,k) is the set of users who rated both item j and item k.

The weight computation module 126 further improves on this estimate in order to overcome the sparseness issue. The averages represented by $\overline{A}_{jk}$ or $\overline{b}_j$ computed using equations (8) and (9) may differ by orders of magnitude in terms of the number of users included in the average. Averages based on relatively low support, that is, averages with a relatively small value of |U(j,k)|, can generally be improved by shrinkage toward a common mean. Thus, in order to perform the weight computation, the module 126 computes a baseline value which is defined by taking the average of all possible values of $\overline{A}_{jk}$. This baseline value can be denoted by avg. The corresponding K×K matrix $\hat{A}$ and the vector $\hat{b} \in R^K$ are defined as follows:

$$\hat{A}_{jk} = \frac{|U(j,k)| \cdot A_{jk} + \beta \cdot avg}{|U(j,k)| + \beta} \quad (10)$$

$$\hat{b}_j = \frac{|U(j,k)| \cdot b_j + \beta \cdot avg}{|U(i,j)| + \beta} \quad (11)$$

The parameter β controls the extent of the shrinkage. A typical value for β when working with residuals of full global effects is β=500.

The best estimates for A and b, used in equation (5) above, are $\hat{A}$ and $\hat{b}$, respectively. Therefore, the weight estimation module 126 implements a modification of equation (5) so that the interpolation weights are defined as the solution of the linear system $$\hat{A}w = \hat{b}. \quad (12)$$

Thus, in order to estimate a rating $r_{ui}$ for an item i and user u, the rating estimation module 123 builds a set of K neighbors comprising the set N(i; u), with the selected neighbors being those exhibiting the highest similarity scores with respect to the item i under consideration. These neighbors are passed to the weight computation module 126, which generates the matrices $\hat{A}$ and $\hat{b}$. Equation (12) is then used to estimate values for the matrix w. The modeling and estimation module 124 substitutes the values $w_{ij}$ of the matrix elements into equation (3) above, in order to compute the value $r_{ui}$.

Preprocessing

In order to provide for more efficient estimation, preprocessing is preferably performed in order to develop values and information used in the estimation. The rating estimation module 123 and its constituent modules may suitably draw from information generated by a preprocessing module 128, which suitably computes values for storage in a preprocessing database 130.

An efficient computation of an item-item neighborhood based estimate is made more efficient by the precomputation of certain values associated with each pair of movies to enable their rapid retrieval. These values suitably include all item-item similarities, that is, the values of $s_{ij}$, as well as all possible entries of the matrix $\hat{A}$. These values may suitably be computed for the entire dataset on which computations are to be performed.

Computing Similarity Values

The similarity values are used for identifying the K neighbors that constitute N(i; u). A number of techniques have been used in the past for choosing values for $s_{ij}$, such as computing $s_{ij}$ as the Pearson correlation coefficient between i and j calculated on their shared users, that is, the users who have rated both items. The values of $s_{ij}$ are typically shrunk based on their support, for example, multiplying the correlation by $|U(i,j)|/(|U(i,j)|+\alpha)$ for some small α. Another example is based on the shrunk mean squared distance between items, given by the following expression:

$$s_{ij} = \frac{|U(i,j)|}{\sum_{u \in |U(i,j)|} (r_{ui} - r_{uj})^2 + \alpha}.$$

However, an improved technique for computing similarity values advantageously used by the preprocessing module 128 or other appropriate module, involves basing a similarity score for two items i and j based on their binary rating history, that is, on the number of users that have rated both items. One important data element used in computing a similarity score according to this technique is $n_{ij}$, that is, the number of users that have rated both i and j. A similarity computation technique according to an aspect of the present invention takes into account various factors affecting the significance of $n_{ij}$ under particular circumstances. It will be recognized, for example, that a value of 5 for $n_{ij}$ means very different things depending on whether $n_i$ and $n_j$, the number of viewings of each item, are on the order of 10 each or 200 each.

To take another example, consider two movies that have each been rated 10 times, but differ as follows. Movie j was always rated by someone who had rated only five other movies, while Movie k was always rated by active viewers who had each rated 100 other movies. That is, Movie j is part of 50 pairs of movies rated by the same user (including multiple occurrences), while Movie k is part of 1000 pairs. If $n_{ij}$=3, that is much stronger evidence of similarity than if $n_{ik}$=3. In order to account for such variability, a similarity computation technique according to an aspect of the present invention chooses or computes a value $x_{ij}$ and uses this value to rescale $n_{ij}$. One advantageous technique for computing and using this variable is as follows.

Let $N_i$ equal the number of pairs involving Movie i; that is, $$N_i = \sum_{j \neq i} n_{ij},$$

and let $$N = \sum_i N_j$$

equal twice the total number of pairs. A suitable value for $x_{ij}$ is given by the expression $x_{ij}=N_iN_j/(N-N_i)+N_iN_j/(N-N_i)$.

This approximately standardizes $n_{ij}$ in the sense that $$\sum_j n_{ij} \approx \sum_j x_{ij}$$

for all i. The value of the expression $(n_{ij}+\alpha)/(x_{ij}+\beta)$, where α and β are optional shrinkage constants, may therefore be used as the similarity score $s_{ij}$.

Precomputation of Entries for $\hat{A}$ and $\hat{b}$

Whichever specific technique is chosen to compute the values for $s_{ij}$, a complete set of values for all pairs i, j, may be computed and stored for later retrieval. The second set of values that are computed is the set of all possible entries for $\hat{A}$ and $\hat{b}$. Therefore, for each of two items i and j, the expression $$\overline{A}_{ij} = \frac{\sum_{v \in |U(i,j)|} (r_{vi} r_{vj})}{|U(i, j)|}$$

is computed. Then, the baseline value avg, used in equations (10) and (11) above, is taken as the average entry of the precomputed n×n matrix $\overline{A}$. In the present exemplary embodiment, two different baseline values, are used, one computed by averaging the non-diagonal entries of $\overline{A}$ and another one by averaging the diagonal entries. This procedure accounts for the fact that the diagonal entries are expected to have an inherently higher average because they sum only non-negative values. A full n×n matrix $\hat{A}$ is derived from $\overline{A}$ using equation (10) above. Here, the nondiagonal average is used when deriving the non-diagonal entries of $\hat{A}$, whereas the diagonal average is used when deriving the diagonal entries of $\hat{A}$.

Because of symmetry, it is sufficient to store the values of $s_{ij}$ and $\hat{A}_{ij}$ only for i>j.

Storage and Processing Requirements for Precomputations

In configuring the weight computation module 126 and the precomputation module 128, one byte may suitably be allocated for each individual value, so that overall space complexity for n items is exactly n(n+1) bytes. This allocation yields an easily manageable demand for computational and storage resources. For example, the NETFLIX® dataset contains on the order of 20,000 movies. Overall memory requirements for computations on this dataset are 300 MB. This space is easily available in core memory of a reasonably powerful personal computer. A more comprehensive system, providing resources for recommendations relating to 100,000 items, for example, would require approximately 10 GB of storage. This amount of core memory is available in many 64-bit servers. Still larger datasets can easily be accommodated in disk resident storage. To save space, however, it is possible to choose only larger, more significant values for storage.

Preprocessing time is linearly proportional to the number of ratings, and proportional to the square of the number of items to be evaluated. The time required for computing all values for $s_{ij}$ and all values for $\hat{A}_{ij}$ on the NETFLIX® dataset, containing 100 million ratings, is approximately 15 minutes on a Pentium 4 based personal computer. If desired, preprocessing can be easily parallelized.

Precomputing all possible entries of the matrix $\hat{A}$ and storing these values in the database 130, saves the otherwise lengthy time needed to construct the matrix $\hat{A}$. After retrieving the needed entries of $\hat{A}$, the weight computation module 126 suitably computes interpolation weights by solving a K×K system of equations. For typical values of K, which tend to fall between 20 and 50, this time is comparable to the time for computing the K nearest neighbors, which is common to all neighborhood based approaches. The techniques of the present invention therefore achieve a significantly more detailed computation of the interpolation weights, but do not significantly increase computation time compared to prior art methods.

As noted above, the equation (12) above can be used to determine the interpolation weights, suitably by implementing the weight computation module 126 so as to provide for standard linear equation solvers. However, some increase in accuracy can be achieved if the weight w is constrained to be non-negative. Such a constraint avoids certain redundant overfitting.

Figure 2B:
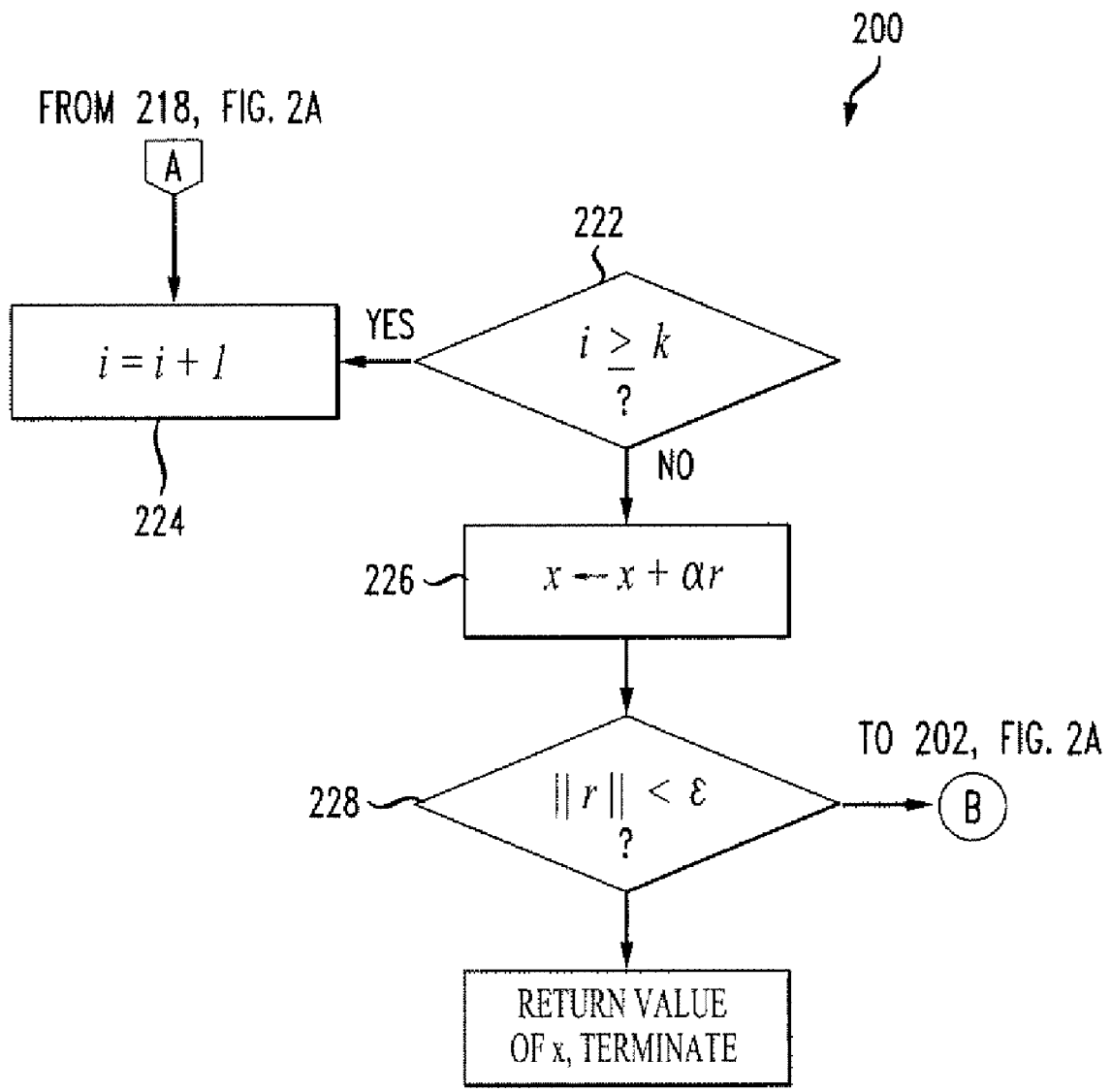

FIG. 2 illustrates a process 200 for computing the non negative quadratic optimization for an input matrix A and an input vector b, with the matrix A and the vector b having the characteristics described above and being computed in the manner described above. The process 200 may suitably be performed by the weight computation module 126 as needed.

At step 202, the expression r←b−Ax is computed. This step finds the residual, or steepest gradient.

Next, an iterative procedure is undertaken, extending through steps 204-226, to find active variables, that is, those that are pinned because of the nonnegativity constraint, and set the respective values of $r_i$ to 0.

The process therefore proceeds to step 204 and a counter i is set to 1. Next, at step 206, a decision is made, depending on whether $x_i$=0 and $r_i$<0. If this expression is true, then the process proceeds to step 208 and the expression $r_i$←0 is computed. The process then proceeds to step 210. If the decision at step 206 returns a false result, the process skips directly to step 210 without performing step 208. At step 210, the value of i is compared against k. If i is less than k, the process proceeds to step 212. At step 212, the value of i is incremented and the process returns to step 206. If i is equal to k, the process skips to step 214.

At step 214, the expression $$\alpha \leftarrow \frac{r^T r}{r^T A r}$$

is computed. This computation sets the maximum step size. Next, a procedure is undertaken to adjust the step size to prevent negative values. At step 216, a counter i is set to 1. Next, at step 218, a decision is made, depending on whether $r_i$<0. If this expression is true, then the process proceeds to step 220 and the expression $\alpha \leftarrow \min(\alpha, -x_i/r_i)$ is computed. The process then proceeds to step 222. If the decision at step 220 returns a false result, the process skips directly to step 222 without performing step 220.

At step 222, the value of i is compared against k. If i is less than k, the process proceeds to step 224. At step 224, the value of i is incremented and the process returns to step 218. If i is not less than k, the process skips to step 226.

At step 226, the expression x←x+αr is computed. At step 228, the expression $\|r\|\leq \epsilon$ is evaluated. If the expression is true, the process ends and the value of x is returned. If the expression is false, the process returns to step 202. The process thus ends when the residual is close to 0.

Removal of Global Effects

As noted above, the known ratings can be processed to remove global effects. The basic kNN interpolations detailed in equations (1) and (2) above advantageously employ ratings where user and item effects have been taken out in order to avoid some of these effects, such as avoiding predicting too high a value for a movie that happens to have many neighbors with high average ratings, and vice versa. In addition, as noted above, accuracy is improved by taking into account the various identifiable characteristics surrounding ratings, such as those noted above.

In order to identify and remove these and similar effects, the system, the global effects analysis module 121 may suitably be used to process the known ratings that are stored for use in ratings estimation. The module 121 suitably estimates one global effect at a time, such as a main effect for items, a main effect for users, a user time interaction, or the like. At each step, residuals from the previous step are used as a dependent variable for the current step. Consequently, after the first step, the values of $r_{ui}$ are residuals, rather than raw ratings. Computations based on item ratings are presented here, with user based computations being analogous.

The explanatory variable of interest corresponding to item i and user u is suitably denoted by $x_{iu}$. For item main effects, the values of $x_{iu}$ are suitably 1, while for other global effects, $x_{iu}$ is centered for each item by subtracting the mean of $x_{iu}$ for that item. In each case, the model is:

$$r_{ui} = \theta_i x_{iu} + \text{error} \tag{13}$$

With sufficient ratings for item i, the unbiased estimator might be used. This estimator is $$\hat{\theta}_i = \frac{\sum_u r_{ui} x_{iu}}{\sum_u x_{iu}^2},$$

where each summation is over all users rating item i. However for sparse data, some values of $\overline{\theta}_i$ may be based on very few observations, thereby resulting in unreliable estimates.

To avoid overfitting, individual values of $\hat{\theta}_i$ are shrunk toward a common value. Shrinkage can be explained from a Bayesian perspective. If the true values of $\theta_i$ are independent random variables drawn from a normal distribution, $\theta_i \sim N(\mu, r^2)$ for known $\mu$ and $r^2$, while $\hat{\theta}_i | \theta_i \sim N(\theta_i, \sigma_i^2)$ for known values of $\sigma_i^2$. The best estimator for $\theta_i$ is its posterior mean $$E(\theta_i | \hat{\theta}_i) = \frac{r^2 \hat{\theta}_i + \sigma_i^2 \mu}{r^2 + \sigma_i^2}.$$

This is a linear combination of the empirical estimator $\hat{\theta}_i$ and the common mean $\mu$. The parameter $\sigma_i^2$ is estimated from the known formula for the variance of a weighted mean, while the value of $\mu$ can be estimated by the mean of the values of $\hat{\theta}_i$, optionally weighted by $n_u$. Emperical Bayes analysis suggests that the maximum likelihood estimate of $r^2$ can be found as the solution to $$r^2 = \frac{\sum_i [(\hat{\theta}_i - \mu)^2 - \sigma_i^2]/(r^2 + \sigma_i^2)^2}{\sum_i (r^2 + \sigma_i^2)^{-2}}.$$

In practice, a slightly simpler estimation may be used, by assuming that $\mu = 0$ and $\sigma_i^2$ is proportional to $$\frac{1}{n_i},$$

which yields $$\theta_i = \frac{n_i \hat{\theta}_i}{n_i + \alpha},$$

where $n_i$ is the number of ratings of item i and $\alpha$ is a constant, suitably determined by cross validation.

User Oriented Estimation

In addition to computing ratings using an item-oriented approach, it is also possible to undertake a user-oriented approach by switching the roles of users and items in the discussion above. However, an item-oriented approach typically leads to a faster computation because it is possible to precompute and store a full item to item matrix, as accomplished by the precomputation module 128. This procedure is frequently impractical for user oriented approaches because the large number of users adds greatly to the time and storage space required. In addition, experimental results have demonstrated that an item-oriented approach tends to yield more accurate results than a user-oriented approach.

However, user-oriented approaches can identify different kinds of relations that item-oriented approaches may fail to recognize, and thus can be useful on certain occasions. For example, it may be desired to estimate the rating $r_{ui}$ for a user u and item i, in a situation in which none of the items previously rated by the user u is similar to the item i. In this case, an item-oriented approach is likely to prove inaccurate because the most similar items, used to develop the rating, will not in fact be particularly similar to the item i. However, when employing a user-oriented perspective, there may exist a set of users similar to u, who have rated i. The ratings of i by these users may therefore be employed so as to provide for a better estimation of $r_{ui}$.

Another common case occurs when a user u has provided few or no ratings to the system, but has a substantial history of transactions by him, such as purchase history, viewed pages history, searched items and other kinds of implicit information. This may frequently be the case for users who do not understand the value or operation of the recommendation system and so see no use in providing ratings. By employing a user-oriented method on the information associated with user transactions, the user u can be related to other users who did provide ratings for item i, thereby providing an estimate for $r_{ui}$. Finally, accuracy can be improved by mixing the results of the item-oriented approach with those of the user-oriented one. Under appropriate circumstances, therefore, the recommendation module 122 may therefore determine that a user-oriented approach can be used to supplement the item-oriented approach described here, and the rating computation module 123 can be adapted to perform user-oriented calculations as described below.

When applying neighborhood based collaborative filtering in a user-oriented manner, the rating computation 123 implements an efficient process for the creation of N(u; i), which is the set of K users most similar to u that rated item i, which typically involves the computation of a huge number of user-user similarities. Examining all users that rated i, in order to select the K users most similar to u, is also conducted in a way that takes into account the need for efficiency given the fact that the number of users typically greatly exceeds the number of items.

The computational effort of measuring user-user similarities is significantly lowered by embedding all users in a low dimensional Euclidean space. Each user is viewed as a point within the space of n movies. One way to reduce dimensionality is to use principal component analysis (PCA), which may suitably be carried out through the closely related singular value decomposition (SVD), and the rating computation module implements SVD in a way that allows for the use of a set of rating data with many missing or unknown members. SVD is a factorization based technique, and additional discussion of factorization, as well as systems and techniques for the use of factorization and neighborhood awareness in rating computation and recommendation, are discussed in Koren et al., cited above.

The n-dimensional user points are arranged within the m×n matrix R. Consequently, SVD computes the best rank-f approximation $R^f$, which is defined as the product of two rank-f matrices $P_{m \times f}$ and $Q_{n \times f}$, where $\|R-PQ^T\|$ is minimized. The matrix P can be thought of as an optimal f-dimensional embedding of the users. In applying an SVD-based technique to collaborative filtering, the present invention overcomes difficulties presented due to the fact that users frequently rate only a relatively small number of items and that many entries of R are unknown. The presence of a large number of absent or unknown elements in a matrix is conveniently referred to as sparseness, so that the matrix R can be regarded as a sparse matrix. In the present embodiment of the invention, an efficient factorization technique, described below, is used to deal with the missing data.

If the set of (u, i) pairs for which $r_{ui}$ is known are symbolized by κ, the goal of SVD, when restricted to the known ratings, is to minimize the value $$\sum_{(u,i) \in \kappa} (r_{ui} - P_u^T q_i). \tag{13}$$

Here, $p_u$ is the u-th row of P, which corresponds to user u. Likewise, $q_i$ is the i-th row of Q, which corresponds to item i. To avoid overfitting for items and users with relatively sparse data, the model is regularized by penalizing the norm of each $p_u$ and $q_i$, in a technique referred to here as ridge regression. This can be accomplished by replacing equation (13) above with $$\sum_{(u,i) \in \kappa} (r_{ui} - P_u^T q_i) + \lambda(\|p_u\|^2 - \|q_i\|^2). \tag{14}$$

A typical choice of λ for the NETFLIX® data is 0.05. To minimize equation (14), an alternating least squares strategy is employed. This procedure alternates between fixing Q and P, thereby obtaining a series of efficiently solvable least squares problems.

To further avoid overfitting, the entries of P and Q are restricted so as to be nonnegative by using a nonnegative least squares solver. P and Q thus form a regularized nonnegative matrix factorization for the partially observed matrix R.

When recomputing P, each user u is addressed as follows. As noted above, $n_u$ is the number of ratings by u. The $n_u \times f$ matrix Q[u] is used to denote the restriction of Q to the items rated by u, the vector $r_u \in R^{n_u}$ contains the given ratings by u ordered as in Q[u]. The new value for $p_u$ is given by solving a nonnegative least-squares problem, which is:

$$\begin{pmatrix} Q[u] \\ \Lambda \end{pmatrix} pu = \begin{pmatrix} r_u \\ 0 \end{pmatrix}.$$

Here, Λ is an f×f diagonal matrix, where all diagonal entries are $\sqrt{\lambda n_u}$. The computation of Q is analogous.

The matrices P and Q are recomputed until convergence is achieved at an f-dimensional embedding of the users P, typically requiring several tens of iterations. A suitable value for f is 10. The low dimensional embedding of the users is performed only once, at a preprocessing stage. In order to identify neighboring users, the low dimensional representation is used, thereby significantly alleviating the computational complexity of the user-based computations and facilitating their use in real life, large datasets, such as the NETFLIX® data. Further performance gains can be achieved by organizing the f-dimensional user points within a space-partitioning data structure, such as a k-dimensional tree, or kd-tree, allowing for an efficient retrieval of the nearest points, that is, the most similar users.

After identifying the K most similar users N(u; i), computation proceeds with computation of interpolation weights, using a procedure similar to that described above in connection with item-oriented estimation, and culminating in the computation of the value w, using an expression similar to equation (12) above, that is, $\hat{A}w=\hat{b}$. However, in the case of user-oriented estimation, precomputation of the inner products of user-user pairs is not performed because the number of users is so great that this precomputation is impractical.

At the stage of computing the interpolation weights, however, the process has only to deal with K users. This limitation on the number of users for whom calculations must be made avoids excessive computational complexity, especially considering that individual users are typically associated with far fewer ratings compared to individual items.

The discussion above assumes that relationships among users are fixed across all items. However, in reality, a particular user v may be very predictive of user u for certain kinds of items, but less predictive for other items. When estimating $r_{ui}$, it is desirable to derive user-user interpolation weights that reflect how the neighboring users relate to u with respect to the given item i. Thus, when determining the user-user interpolation weights, a higher consideration is therefore given to items similar to i, which may serve as a proxy for the predictive value of neighboring users with respect to the specific considered item. In order to achieve this, item-item similarities, that is, $s_{ij}$, may be introduced into the user-oriented version of equation (4) above, which thus becomes $$\min_w \sum_{j \neq i} s_{ij} \left( r_{uj} - \sum_{v \in N(u;i)} w_{uv} r_{vj} \right)^2 \tag{15}$$

Similarly, the user-oriented version of matrix A and vector b of equations (6) and (7) become $$A_{v_1 v_2} = \sum_{j \neq i} s_{ij} r_{v_1 j} r_{v_2 j} \text{ and } A_{v_1 v_2} = \sum_{j \neq i} s_{ij} r_{v_1 j} r_{uj}.$$

Essentially, these modifications inject item-item relationships into the user-user model. Possible choices for $s_{ij}$ are the absolute value of the Pearson correlation coefficient, or an inverse of the squared distance between i and j. As usual with item-item magnitudes, all values of $s_{ij}$ can be precomputed and stored, so introducing them into the user-user model barely affects running time while benefiting prediction accuracy, so this procedure is suitably employed whenever user-oriented modeling is employed.

A parallel idea can be used for integrating user awareness into the item-oriented model, but this procedure requires the item-item inner products to be computed specifically for each query in order to reflect the relevant user similarities. The computational complexity that this involves prevents the precomputation and storage of all item-item inner products. Because items are typically associated with large numbers of ratings, an online computation of their inner products is expensive and impractical for large datasets.

The system 100 may employ the above properties and relationships in numerous different ways to provide recommendations for a customer. In one example, recommendations are to be presented to a customer u logging in to the system 100, for example, using the customer computer 104A. Periodically, the system 100 computes ratings $r_{ui}$ for movies i that the customer u has not yet watched. When the customer u logs in to the system 100, these ratings may be examined to generate recommendations for the customer u.

The recommender module 122 invokes the rating computation module 123 to compute a rating $r_{ui}$ for movies i that the user u has not yet watched. Ratings may be generated for all movies available, suitably on a periodic schedule. In order to reduce computational demands, however, it may be desired to rate only a subset of movies. Many movies receive low ratings from a broad cross section of the populace, and movies that receive such low ratings may not need to have ratings estimated for users who have not yet viewed them. Such a practice can significantly decrease the computational demands required to operate the rating computation module 123, because it can greatly decrease the number of movies that need to be rated. In addition, excluding movies having an average rating below a particular threshold would not significantly impair the accuracy of recommendations, because if the rating for the movie is generally low, it can be expected that the estimated rating for a particular user would also be low, because the rating is estimated based on ratings by other users.

In order to simplify the process of rating computation, selected data used in the process is computed and stored by the preprocessing module 128. The preprocessing module 128 computes values for $s_{ij}$, as well as the matrices $\hat{A}$ and $\hat{b}$. The values for $s_{ij}$ are similarity values for the similarity between each pair of movies i and j, and the matrices $\hat{A}$ and $\hat{b}$ are the inner products between all movies j and k, described above. The appropriate elements of the matrices $\hat{A}$ and $\hat{b}$ are used to determine interpolation weights for selected neighbors, according to equation (12) above. The values of $s_{ij}$ and the matrices $\hat{A}$ and $\hat{b}$ are stored in the preprocessing module, and selected values, that is, values of $s_{ij}$ for a particular i and j, and elements $\hat{A}_{jk}$ and $\hat{b}_{jk}$ for specific values of j and k, can be retrieved when needed.

For a movie i, the rating computation module 123 suitably identifies a set of K neighbors, that is, the K movies j whose similarity value is highest with respect to i. As noted above, one suitable range for the value of K is from 20 to 50, and the specific value of K can be specified during design of the system 100 and modified as desired. The weight computation module 126 is then invoked to compute the interpolation weights by solving the equation (12), and global effects are removed using the procedure described above. The computed interpolation weights are used to solve equation (3) above, that is, $r_{ui} \leftarrow \sum_{j \in N(u;i)} w_{ij} r_{uj}$, to yield an estimated rating for the movie i by the user u.

As noted above, all of this computation can be done at any time that it is desired to devote processing resources to it, and a table of rankings can be built for the user u. Whenever the user u logs in to the system 100, the movies with the highest estimated rankings for the user can be presented as recommendations, with the number presented being whatever number is desired. The recommendation module 122 may also be configured to allow the user to choose how many recommendations are to be presented. In addition, the highest ranking movies in specified categories, such as comedies, dramas, science fiction, and the like, may be presented.

FIG. 3 illustrates the steps of a method 300 of movie recommendation according to an aspect of the present invention. At step 302, a plurality of movie ratings are received from users. The users may suitably be subscribers to a movie service, with users who have recently returned movies being solicited to provide ratings of those movies. A matrix of all movie ratings by all users is suitably constructed and stored. At step 304, computations are performed to estimate global effects and to perform normalization for their removal. At step 306, a similarity measure $s_{ij}$ is suitably computed for each pair of movies i and j, and a matrix of the similarity measures is stored. At step 308, all possible entries of the matrix $\hat{A}$ and the vector $\hat{b}$ are calculated, according to equations (10) and (11) above, and stored. At step 310, for each item i whose rating for a user u is to be estimated, a set of K nearest neighbors, that is, items j whose similarity values $s_{ij}$ are highest, are selected, and at step 312, the values for $\hat{A}_{ji}$ and $\hat{b}_j$ are retrieved. At step 314, the values of $\hat{A}_{ji}$ and $\hat{b}_j$ are used to compute interpolation weights $w_{ij}$. At step 316, the interpolation weights and the neighboring ratings are used to estimate the rating $r_{ui}$ for the item i and the user u. Steps 312-316 may suitably be performed for all users and all items, with a complete set of estimated ratings being stored, or, if desired, a set of estimated ratings may be computed for a particular user by performing steps 312 and 316 to compute all ratings for that user whenever desired, such as when a user logs on to a service. At step 318, suitably when a user logs on to a service, a suitable number of movies having the highest values for $r_{ui}$ are selected and their titles and additional relevant information presented to the user as recommendations. If desired, selection and presentation may be performed for groups of movies in multiple genres, such as recommended comedies, recommended dramas, and the like.

While the invention is disclosed in the context of a presently preferred embodiment, it will be recognized that a wide variety of implementations may be employed by persons of ordinary skill in the art consistent with the above discussion and the claims which follow below.

We claim:
1. A system for estimating user ratings for items based on previous rating activity by the same user for different items and by different users for the same and different items, comprising:
   a processor;
   a memory for storing data and instructions for execution by the processor;
   a database stored in the memory, the database storing rating information for a plurality of items and a plurality of users;
   a rating computation module implemented as software stored in the memory and executable by the processor, the rating computation module estimating a rating $r_{ui}$ for an item i by a user u based on rating activity by the same and different users, the rating computation module selecting a predetermined number of neighboring ratings most closely associated with the rating $r_{ui}$, the rating computation module assigning interpolation weights to the selected ratings, the interpolation weights being based on a matrix $\hat{A}$, each entry of the matrix $\hat{A}$ comprising a summation of pairwise relationships of ratings of two neighboring items by neighboring users, and a vector $\hat{b}$, each entry of the vector $\hat{b}$ comprising a summation of pairwise relationships of a neighboring item by a neighboring user and the item i by a neighboring user, each entry of the matrix $\hat{A}$ and the vector $\hat{b}$ being computed so as to take into account the support exhib- ited by each pair of ratings under consideration, the support including the number of users rating both items of a pair.

2. The system of claim 1, wherein the interpolation weights are computed simultaneously so as to account for relationships among the neighbors.

3. The system of claim 2, wherein computation of estimated ratings is preceded by estimation of global effects affecting known ratings and normalization is performed to remove global effects.

4. The system of claim 1, wherein computation of the interpolation weights is preceded by computation of similarity measures between all pairs of elements contributing to ratings.

5. The system of claim 4, wherein the computation of a similarity measure for a pair of items includes taking into account the number of users rating both items, the number of users rating both items being rescaled to take into account variability surrounding the number of users rating both items.

6. The system of claim 5, wherein the rescaling of the number of users rating both of a pair of items takes into account the number of items rated by each user.

7. The system of claim 1, wherein the neighbors are ratings for items having the highest similarities to the rated item i.

8. A method of recommendation of items meeting customer needs, comprising:
  collecting ratings for a plurality of items for a plurality of users;
  estimating a rating $r_{ui}$ for each of a plurality of items i for a user u, estimating the rating comprising:
    selecting a plurality of neighbors having the highest similarity to the item to be rated; and
    assigning interpolation weights to the selected ratings, the interpolation weights being based on a matrix $\hat{A}$ and a vector $\hat{b}$, each entry of the matrix $\hat{A}$ comprising a summation of pairwise relationships of ratings of two neighboring items by neighboring users, each entry of the vector $\hat{b}$ comprising a summation of pairwise relationships of a neighboring item by a neighboring user and the item by a neighboring user, each entry of the matrix $\hat{A}$ and the vector $\hat{b}$ being computed so as to take into account the support exhibited by each pair of ratings under consideration, the support taking the form of the number of users rating both items of a pair;
  selecting a predetermined number of items having the highest estimated ratings; and
  presenting recommendations to the user identifying the plurality of items having the highest estimated ratings.

9. The method of claim 8, wherein computing the interpolation weights is performed independently of similarity measures between items.

10. The method of claim 9, wherein computing the interpolation weights is performed simultaneously to account for interrelationships among the neighbors.

11. The method of claim 8, wherein computing the interpolation weights is preceded by estimating global effects affecting ratings and performing normalization to remove global effects.

12. The method of claim 8, wherein similarity measures for all pairs of items are computed and stored for use in selecting neighbors to be used in rating computation.

* * * * *